(12) United States Patent
Askan et al.

(10) Patent No.: US 10,903,022 B2
(45) Date of Patent: Jan. 26, 2021

(54) ELECTRICAL CIRCUIT BREAKER ASSEMBLY

(71) Applicant: Eaton Intelligent Power Limited, Dublin (IE)

(72) Inventors: Kenan Askan, Vienna (AT); Michael Bartonek, Vienna (AT)

(73) Assignee: EATON INTELLIGENT POWER LIMITED, Dublin (IE)

(*) Notice: Subject to any disclaimer, the term of this patent is extended or adjusted under 35 U.S.C. 154(b) by 221 days.

(21) Appl. No.: 16/252,773

(22) Filed: Jan. 21, 2019

(65) Prior Publication Data

US 2019/0228925 A1 Jul. 25, 2019

(30) Foreign Application Priority Data

Jan. 22, 2018 (DE) .......................... 10 2018 101 311

(51) Int. Cl.
| | | |
|---|---|---|
| *H01H 9/54* | (2006.01) | |
| *H02H 1/00* | (2006.01) | |
| *H02H 3/16* | (2006.01) | |

(52) U.S. Cl.
CPC ............ *H01H 9/542* (2013.01); *H01H 9/548* (2013.01); *H02H 1/0007* (2013.01); *H02H 3/16* (2013.01); *H01H 2009/543* (2013.01); *H01H 2009/544* (2013.01)

(58) Field of Classification Search
None
See application file for complete search history.

(56) References Cited

U.S. PATENT DOCUMENTS

| | | | | |
|---|---|---|---|---|
| 8,716,997 | B2* | 5/2014 | Rao ...................... | H03K 17/167 |
| | | | | 323/283 |
| 2006/0044724 | A1* | 3/2006 | Ishii ...................... | H02M 3/158 |
| | | | | 361/90 |
| 2014/0313628 | A1 | 10/2014 | Häfner et al. | |
| 2018/0112647 | A1* | 4/2018 | Abeyasekera | ............ H02J 3/38 |
| 2020/0321888 | A1* | 10/2020 | Tobayashi | ........... H02M 1/4208 |

FOREIGN PATENT DOCUMENTS

| | | |
|---|---|---|
| EP | 2320535 A1 | 5/2011 |
| WO | WO 2011057675 A1 | 5/2011 |
| WO | WO 2015028634 A1 | 3/2015 |

* cited by examiner

*Primary Examiner* — Jeffrey A Gblende
(74) *Attorney, Agent, or Firm* — Leydig, Voit & Mayer, Ltd.

(57) ABSTRACT

A low-voltage circuit breaker device includes: a first outer conductor line and at least one first bypass line, the first outer conductor line being arranged in the circuit in parallel to the at least one first bypass line; a first mechanical bypass switch arranged in the first outer conductor line; first semiconductor circuit assembly connected in parallel to the first bypass switch; a second semiconductor circuit assembly arranged in the circuit in series with the first bypass switch and parallel to the first semiconductor circuit assembly in the first outer conductor line; a first current measuring assembly, which is connected to a first electronic control unit, arranged in the first outer conductor line, the first electronic control unit being arranged to actuate the first bypass switch, the first semiconductor circuit assembly, and the second semiconductor circuit assembly; and a second mechanical bypass switch arranged in the first bypass line.

8 Claims, 3 Drawing Sheets

ELECTRICAL CIRCUIT BREAKER ASSEMBLY

CROSS-REFERENCE TO PRIOR APPLICATION

Priority is claimed to German Patent Application No. DE 10 2018 101 311.6, filed on Jan. 22, 2018, the entire disclosure of which is hereby incorporated by reference herein.

FIELD

The invention relates to an electrical circuit breaker assembly.

BACKGROUND

Allocating electrical currents onto multiple branches by parallel connection is known, whereby the overall current is allocated onto the individual parallel branches in accordance with Kirchhoff's first law.

Furthermore, so-called hybrid circuit breaker devices are known, for example, from WO 2015/028634 A1 of the applicant. Such hybrid circuit breaker devices have numerous advantages in relation to conventional solely mechanical circuit breakers. However, it has been shown that it is not possible to increase the current carrying capacity of an electrical line and/or enhance its emergency protection by parallel connection of hybrid switching devices according to WO 2015/028634 A1. Certain properties of the mechanical switch contacts installed in such switching devices and the semiconductor elements result in a substantial drift of the internal resistances of such hybrid switching devices connected in parallel, whereby the current allocation between such switching devices also drifts at the same time. Within a short time after startup, this has the result that the current allocation is uneven.

SUMMARY

In an embodiment, the present invention provides a low-voltage circuit breaker device, comprising: a first outer conductor line and at least one first bypass line, the first outer conductor line being arranged in a circuit in parallel to the at least one first bypass line; a first mechanical bypass switch arranged in the first outer conductor line; first semiconductor circuit assembly connected in parallel to the first bypass switch; a second semiconductor circuit assembly arranged in the circuit in series with the first bypass switch and parallel to the first semiconductor circuit assembly in the first outer conductor line; a first current measuring assembly, which is connected to a first electronic control unit, arranged in the first outer conductor line, the first electronic control unit being configured to actuate the first bypass switch, the first semiconductor circuit assembly, and the second semiconductor circuit assembly; a second mechanical bypass switch arranged in the first bypass line; a fourth semiconductor circuit assembly arranged in the circuit in series with the second bypass switch in the first bypass line; and a second current measuring assembly, which is connected to the first electronic control unit, arranged in the first bypass line, wherein the first electronic control unit is configured to actuate the second bypass switch and the fourth semiconductor circuit assembly, wherein the first electronic control unit is configured to regulate the second semiconductor circuit assembly and the fourth semiconductor circuit assembly to balance a first current strength via the first outer conductor line and a second current strength via the first bypass line, and/or wherein the first electronic control unit is configured to switch off the first bypass line if the first current strength and/or the second current strength is less than a predefinable limiting value.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a low-voltage circuit breaker device of the above-mentioned type, using which disadvantages mentioned at the outset can be avoided, and using which the current carrying capacity of a low-voltage circuit breaker device can be increased safely and permanently.

It is thus possible to relieve a hybrid outer conductor line by parallel connection of at least one bypass line, without the entire current load or at least a predominant part of the current load having to be handled by only one of the participating lines. It is thus possible to prevent one of the participating lines from aging and failing more rapidly than the at least one further line due to excess power loss. It is thus furthermore possible to prevent a total failure from occurring in the case of an emergency shutdown.

Figure 1:
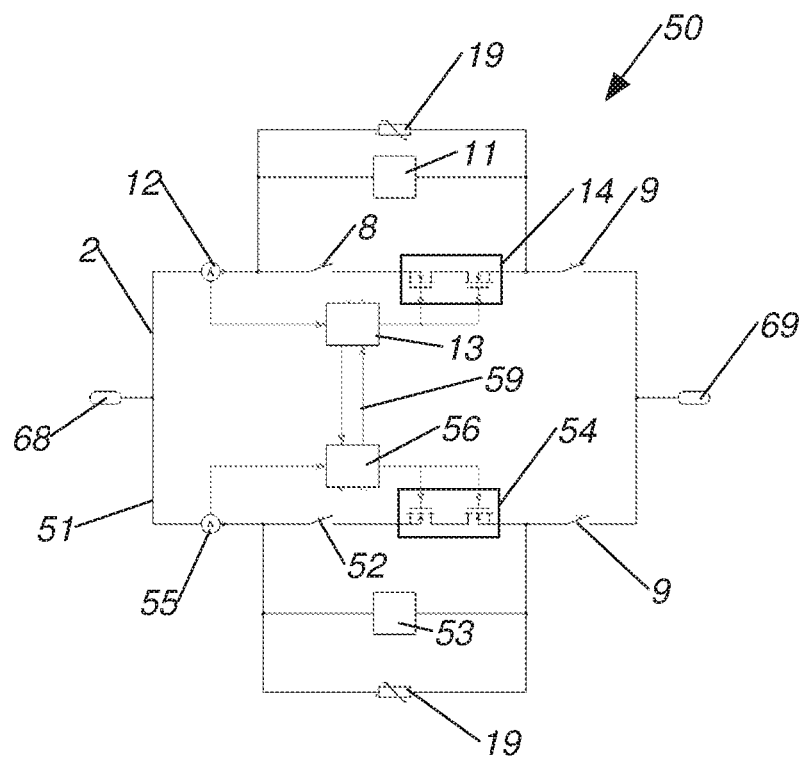
FIG. 1 shows a first embodiment of a present electrical circuit breaker assembly.
Figure 3:
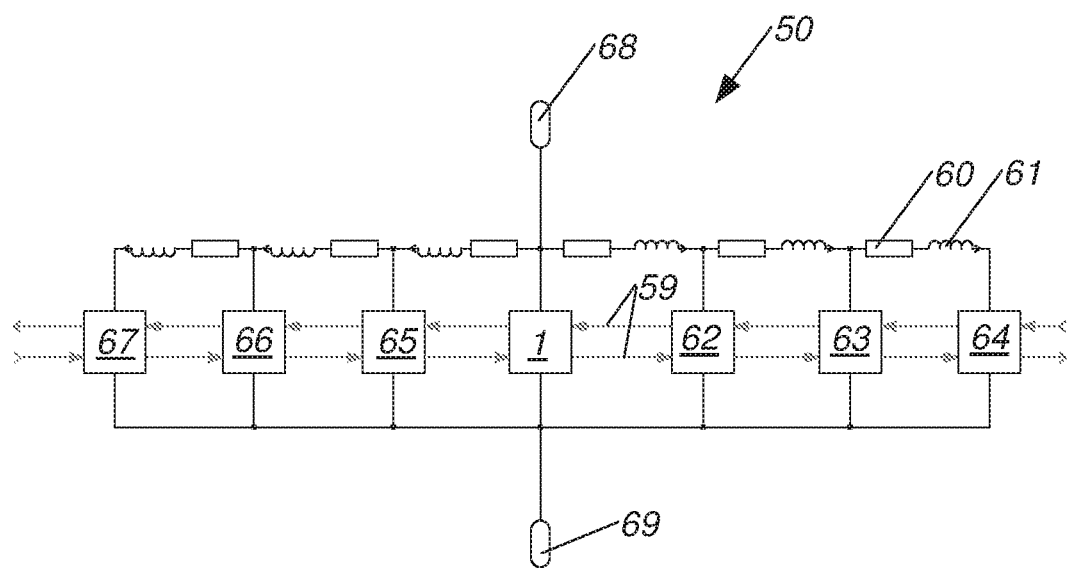
FIG. 3 shows a second embodiment of a present electrical circuit breaker assembly having seven low-voltage circuit breaker devices according to FIG. 2.

FIGS. 1 and 3 each show an electrical circuit breaker assembly 50 comprising a first outer conductor line 2 and a second outer conductor line 51, wherein the first outer conductor line 2 is arranged in the circuit in parallel to the second outer conductor line 51, wherein a first mechanical bypass switch 8 is arranged in the first outer conductor line 2, wherein a first semiconductor circuit assembly 11 is connected in parallel to the first bypass switch 8, wherein a second semiconductor circuit assembly 14 is arranged in the circuit in series with the first bypass switch 8 and parallel to the first semiconductor circuit assembly 11 in the first outer conductor line 2, wherein a first current measuring assembly 12, which is connected to a first electronic control unit 13, is arranged in the first outer conductor line 2, wherein the first electronic control unit 13 is designed for the purpose of actuating the first bypass switch 8, the first semiconductor circuit assembly 11, and the second semiconductor circuit assembly 14, wherein a second mechanical bypass switch 52 is arranged in the second outer conductor line 51, wherein a third semiconductor circuit assembly 53 is connected in parallel to the second bypass switch 52, wherein a fourth semiconductor circuit assembly 54 is arranged in series with second bypass switch 2 and in parallel to the third semiconductor circuit assembly 53 in the circuit in the second outer conductor line 51, wherein a second current measuring assembly 55, which is connected to a second electronic control unit (56), is arranged in the second outer conductor line 51, wherein the second electronic control unit 56 is designed for the purpose of actuating the second bypass switch 52, the third semiconductor circuit assembly 53, and the fourth semiconductor circuit assembly 54.

The first electronic control unit 13 and the second electronic control unit 56 have a communication connection, wherein the first electronic control unit 13 regulates the second semiconductor circuit assembly 14 and the second electronic control unit 56 regulates the fourth semiconductor circuit assembly 54 to balance a first current strength via the first outer conductor line 2 and the second current strength via the second outer conductor line 51, and/or wherein the first electronic control unit 13 and the second electronic control unit 56 switch off the second outer conductor line 51 in the event of a first current strength and/or a second current strength less than a predefinable limiting value.

It is thus possible to connect multiple hybrid outer conductor lines 2, 51 in parallel, without the entire current load or at least a predominant part of the current load being able to be handled by only one of the participating outer conductor lines 2, 51. It is thus possible to prevent one of the participating outer conductor lines 2, 51 from aging and failing more rapidly than the at least one other outer conductor line 2, 51 due to excess power loss. It is thus furthermore possible to prevent a total failure of one of the outer conductor lines 2, 51 from occurring in case of an emergency shutdown.

Figure 2:
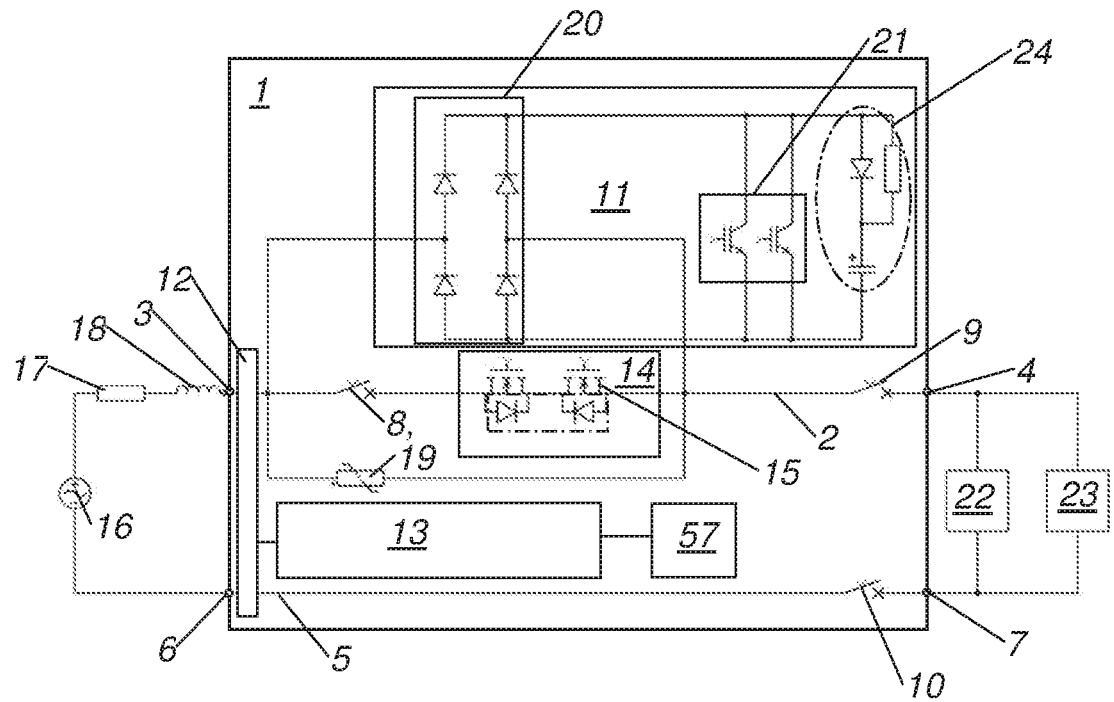
FIG. 2 shows a first embodiment of a discrete low-voltage circuit breaker device for a present electrical circuit breaker assembly.

The present device or assembly according to FIGS. 1 to 3 relates to an electrical circuit breaker assembly 50, which can be embodied or implemented either by interconnecting multiple independent and/or autonomous or discrete low-voltage circuit breaker devices 1 or within a single correspondingly designed circuit breaker device 1.

The individual required components will be described by way of introduction on the basis of the low-voltage circuit breaker device 1 shown in FIG. 2. The relevant low-voltage circuit breaker device 1 displays the first of two outer conductor lines 2.

The present low-voltage circuit breaker device 1 and also the circuit breaker device according to WO 2015/028634 A1 are low-voltage circuit breaker devices. As is typical per se, the range up to 1,000 V AC voltage or 1,500 V DC voltage, respectively, is referred to as low voltage.

The circuit breaker device 1 according to FIG. 2 has an outer conductor line 2 and a neutral conductor line 5. The first outer conductor line 2 extends through the circuit breaker device 1 from an outer conductor supply terminal 3 to an outer conductor load terminal 4. The neutral conductor line 5 extends through the circuit breaker device 1 from a neutral conductor terminal 6 to a neutral conductor load terminal 7. The relevant terminals 3, 4, 6, 7 are each preferably designed as screw connection terminals and/or plug connection terminals and are arranged in the circuit breaker device 1 so they are externally accessible.

The circuit breaker device 1 preferably has an insulating material housing.

A first mechanical bypass switch 8, preferably having single contact interruption, is arranged in the first outer conductor line 2. In the switch according to FIG. 2, furthermore a first mechanical disconnection switch 9 is arranged in series with the first bypass switch 8 in the outer conductor line 2. A second mechanical disconnection switch 10 is arranged in the neutral conductor line 5. A first semiconductor circuit assembly 11 is connected in parallel to the first bypass switch 8.

Furthermore, an overvoltage arrester 19 is connected in parallel to the first bypass switch 8.

The circuit breaker device 1 furthermore has a first current measuring assembly 12, which is arranged in the first outer conductor line 2, and which is preferably designed comprising a shunt resistor.

The first current measuring assembly 12 is connected to a first electronic control unit 13 of the circuit breaker device 1, which is preferably designed comprising a microcontroller or microprocessor. The first electronic control unit 13 is designed for the purpose of actuating the first bypass switch 8 and the first semiconductor circuit assembly 11, and also the first mechanical disconnection switch 9 and the second mechanical disconnection switch 10, therefore, to actuate or switch them in a predefinable manner. For this purpose, the first electronic control unit 13 is connected, preferably by circuitry, to the first semiconductor circuit assembly 11, and also furthermore to in particular electromagnetic actuating elements of the mechanical switches, therefore the first bypass switch 8, the first mechanical disconnection switch 9, and the second mechanical disconnection switch 10. The corresponding connections originating from the first electronic control unit 13 are not shown in FIG. 2.

The first semiconductor circuit assembly 11 has, according to the embodiment in FIG. 2, a rectifier circuit 20, which is preferably designed as a full bridge, and also, in the present embodiment, two power semiconductors 21, which are designed in the present case as IGBTs, as the actual switching or regulating elements. A larger power semiconductor 21 can also be provided in this case. The present device or assembly is independent of the specific implementation of the first semiconductor circuit assembly 11.

The electrical environment is furthermore indicated in FIG. 2 in addition to the actual circuit breaker device 1. In this case, the supply network is represented by the AC/DC network voltage source 16, the network internal resistance 17, and the network inductance 18. Furthermore, an electrical load 23 and an electrical fault 22 in the form of a short-circuit are shown.

It is preferably provided that the first electronic control unit 13 is furthermore designed for the purpose of actuating the first mechanical disconnection switch 9.

It is also preferably provided that a second mechanical disconnection switch 10 is arranged in the neutral conductor line 5, and the first electronic control unit 13 is preferably designed for the purpose of actuating the second mechanical disconnection switch 10. Furthermore, an overvoltage arrester 19, in particular a varistor, preferably an MOV, is arranged in the circuit in parallel to the first bypass switch 8 and the first semiconductor circuit assembly 11, and in series with the first disconnection switch 9. MOV stands for metal-oxide varistor in this case.

It is provided that a second semiconductor circuit assembly 14 is arranged in series in the circuit with the first bypass switch 8 and parallel to the first semiconductor circuit assembly 11 in the first outer conductor line 2.

The load of both the first bypass switch 8 and also the first semiconductor circuit assembly 11 can be reduced by the second semiconductor circuit assembly 14. It is thus possible that the current is commutated to the first semiconductor circuit assembly 11 already at significantly lower current strength than in the case of conventional circuit breaker devices, whereby the load of the first semiconductor circuit assembly 11 can be reduced and its service life can be lengthened. The occurrence of an electric arc at the first bypass switch 8 can thus be avoided essentially completely, whereby the load of the corresponding switch contacts can be reduced and their service life can be lengthened.

Further advantages can be achieved by the present measures. Since an electric arc does not occur upon shutdown, an electric arc also does not have to be extinguished. Hot ionized gases do not arise, which have to be cooled first in order to prevent renewed ignition of an electric arc. The carrying capacity of the first semiconductor circuit assembly 11 can thus both be reduced, and also the entire shutdown procedure can be further accelerated, since renewed ignition of an electric arc is no longer a concern in the present case. Alternatively, the carrying capacity of the first semiconductor circuit assembly 11 can also remain unchanged and the opening speed of the first bypass switch 8 can be reduced, whereby it can be designed more simply.

Due to the rapid shutdown of a short-circuit current or overload current, less energy is stored than otherwise in the form of leakage inductances and/or in the network inductance, whereby the first overvoltage arrester 19 and the snubber 24 are protected. They can also be dimensioned smaller because of further effects.

Since switching electric arcs do not occur, the voltage drop at the first semiconductor circuit assembly 11 is not limited by the electric arc voltage.

It is preferably provided that the second semiconductor circuit assembly 14 and/or the fourth semiconductor circuit assembly 54 is/are designed as bidirectional. The second semiconductor assembly 14 and the fourth semiconductor circuit assembly 54 are particularly preferably designed as four-quadrant circuits, for both current directions and both voltage polarities.

It is furthermore preferably provided that the second semiconductor circuit assembly 14 and the fourth semiconductor circuit assembly 54 are designed comprising low voltage MOSFETs 15. The second semiconductor circuit assembly 14 and the fourth semiconductor circuit assembly 54 are continuously located in the current flow, because of which the internal resistance thereof is relevant to avoid an excessively large power loss at this point.

The low voltage MOSFETs 15 are preferably selected as 20-30 V MOSFETs, because of their very low internal resistance, and also to keep the power loss low in regular operation. The voltage drop at the low voltage MOSFETs 15 is only used to cause the current to commutate to the first semiconductor circuit assembly 11.

Because of the "intrinsic body diode" and operation of the MOSFETs in the third quadrant, only two such low-voltage MOSFETs 15 are required for a bidirectional switch. Due to the high conductivity, high currents can be achieved with low gate voltages.

The first semiconductor circuit assembly 11 is designed as appropriately loadable, in order to switch the high currents and voltage peaks in the event of a short-circuit. The first semiconductor circuit assembly 11 can be switched off as soon as the contacts of the bypass switch 8 have sufficient contact distance.

The MOSFETs 15 each preferably have an antiparallel diode, which is also referred to as a monolithic body diode.

It is furthermore preferably provided that the electrical circuit breaker assembly 50 has a first outer conductor line 2 and at least one second outer conductor line 51, which are arranged in parallel to one another in the circuit.

A second mechanical bypass switch 52 is arranged in the second outer conductor line 51, wherein a third semiconductor circuit assembly 53, which is designed corresponding to the first semiconductor circuit assembly 11, is connected in parallel to the second bypass switch 52, wherein a fourth semiconductor circuit assembly 54, which is designed corresponding to the second semiconductor circuit assembly 14, is arranged in the circuit in series with the second bypass switch 52 and in parallel to the third semiconductor circuit assembly 53 in the second outer conductor line 51, wherein a second current measuring assembly 55, which is connected to a second electronic control unit 56, which is designed corresponding to the first electronic control unit 13, is arranged in the second outer conductor line 51, similarly to the first current measuring assembly 12, wherein the second electronic control unit 56 is designed for the purpose of actuating the second bypass switch 52, the third semiconductor circuit assembly 53, and the fourth semiconductor circuit assembly 54. The statements on the components of the first outer conductor line 2 are to be applied accordingly.

It is particularly preferably provided that the first and the second outer conductor lines 2, 51 are designed identically except for component tolerances.

The first electronic control unit 13 and the second electronic control unit 56 have a communication connection for transmitting data, in particular the respective current flow data, and also possibly control commands.

It is furthermore provided that the first electronic control unit 13 regulates the second semiconductor circuit assembly 14 and the second electronic control unit 56 regulates the fourth semiconductor circuit assembly 54 to balance a first current strength via the first outer conductor line 2 and the second current strength via the second outer conductor line 51. The current flow via the first and the second outer conductor lines 2, 51 can be balanced by such an active regulation via the second and/or fourth semiconductor circuit assemblies 14, 54. It is thus possible to avoid a one-sided overload of one of the branches occurring.

It is furthermore additionally or alternatively provided thereto that the first electronic control unit 13 and the second electronic control unit 56 switch off the second outer conductor line 51 in the event of a first current strength and/or a second current strength below a predefinable limiting value. One of the two outer conductor lines 2, 51 can thus be operated in standby, and only switched in and operated in the event of corresponding demand.

It is particularly preferably provided that the first and the second electronic control units 13, 56 are designed to carry out both described tasks.

It is preferably provided in this case that the first electronic control unit 13 regulates a gate voltage of the second semiconductor circuit assembly 14, and the second electronic control unit 56 regulates a gate voltage of the fourth semiconductor circuit assembly 54. A simple and efficient actuation of the second and/or fourth semiconductor circuit assemblies 14, 54 is thus possible.

According to a first preferred embodiment of a present electrical circuit breaker assembly 50, it is provided that the first outer conductor line 2, the first mechanical bypass switch 8, the first semiconductor circuit assembly 11, the second semiconductor circuit assembly 14, the first current measuring assembly 12, and the first electronic control unit 13 are arranged in a first low-voltage circuit breaker device 1 comprising a first insulating material housing, as shown in FIG. 2, for example. The relevant first low-voltage circuit breaker device 1 moreover has a first communication interface 57, which has a communication connection to the first electronic control unit 13.

The first communication interface 57 can be designed per se in accordance with any data transmission method. It is preferably provided that the first communication interface 57 is a wired interface, therefore, for example, ethernet, TCP/IP, and/or EIB, wherein other methods or standards can obviously also be used.

According to the first preferred embodiment of a present electrical circuit breaker assembly 50, it is also provided that the second outer conductor line 51, the second mechanical bypass switch 52, the third semiconductor circuit assembly 53, the fourth semiconductor circuit assembly 54, the second current measuring assembly 55, and the second electronic control unit 56 are arranged in a second low-voltage circuit breaker device 62 comprising a second insulating material housing, the second low-voltage circuit breaker device 62 has a second communication interface, which has a communication connection to the second electronic control unit 56. The second low-voltage circuit breaker device 62 is also preferably designed corresponding to FIG. 2.

According to the first preferred embodiment of a present electrical circuit breaker assembly 50, it is furthermore provided that the first communication interface 57 has a communication connection to the second communication interface. Different low-voltage circuit breaker devices 1, 62, 63, 64, 65, 66, 67 can thus be connected in parallel depending on the requirement.

It is preferably provided in this case that such a construction made of discrete low-voltage circuit breaker devices 1, 62, 63, 64, 65, 66, 67 can be cascaded.

FIG. 3 shows a corresponding construction having a first low-voltage circuit breaker device 1, a second low-voltage circuit breaker device 62, a third low-voltage circuit breaker device 63, a fourth low-voltage circuit breaker device 64, a fifth low-voltage circuit breaker device 65, a sixth low-voltage circuit breaker device 66, and a seventh low-voltage circuit breaker device 67, wherein in each case only the outer conductor terminals are shown, and moreover neutral conductor lines can also be provided for each low-voltage circuit breaker device 1, 62, 63, 64, 65, 66, 67.

The individual low-voltage circuit breaker devices 1, 62, 63, 64, 65, 66, 67 are electrically connected to the common terminals 68, 69. Furthermore, the line resistance 60 and the line inductance 61 are shown in FIG. 3.

According to a second preferred embodiment of a present electrical circuit breaker assembly 50, it is provided that the first outer conductor line 2, the first mechanical bypass switch 8, the first semiconductor circuit assembly 11, the second semiconductor circuit assembly 14, the first current measuring assembly 12, and the first electronic control unit 13, the second outer conductor line 51, the second mechanical bypass switch 52, the third semiconductor circuit assembly 53, the fourth semiconductor circuit assembly 54, the second current measuring assembly 55, and the second electronic control unit 56 are arranged jointly in the same low-voltage circuit breaker device 1 comprising a first insulating material housing, and the first electronic control unit 13 has a communication connection, in particular by circuitry, to the second electronic control unit 56. FIG. 1 shows a corresponding construction, which can already be implemented in this form, or can also be supplemented by a neutral conductor line 5, however.

It is preferably provided in this context that the first electronic control unit 13 and the second electronic control unit 56 are formed in one piece, in particular at least partially in a common chip.

It is furthermore preferably provided that the electrical circuit breaker assembly 50 has at least one third outer conductor line, which is arranged in the circuit in parallel to the first outer conductor line 2 and second outer conductor line 51, wherein still further outer conductor lines can also be provided in parallel to the first and second outer conductor lines 2, 51, of course.

Figure 5:
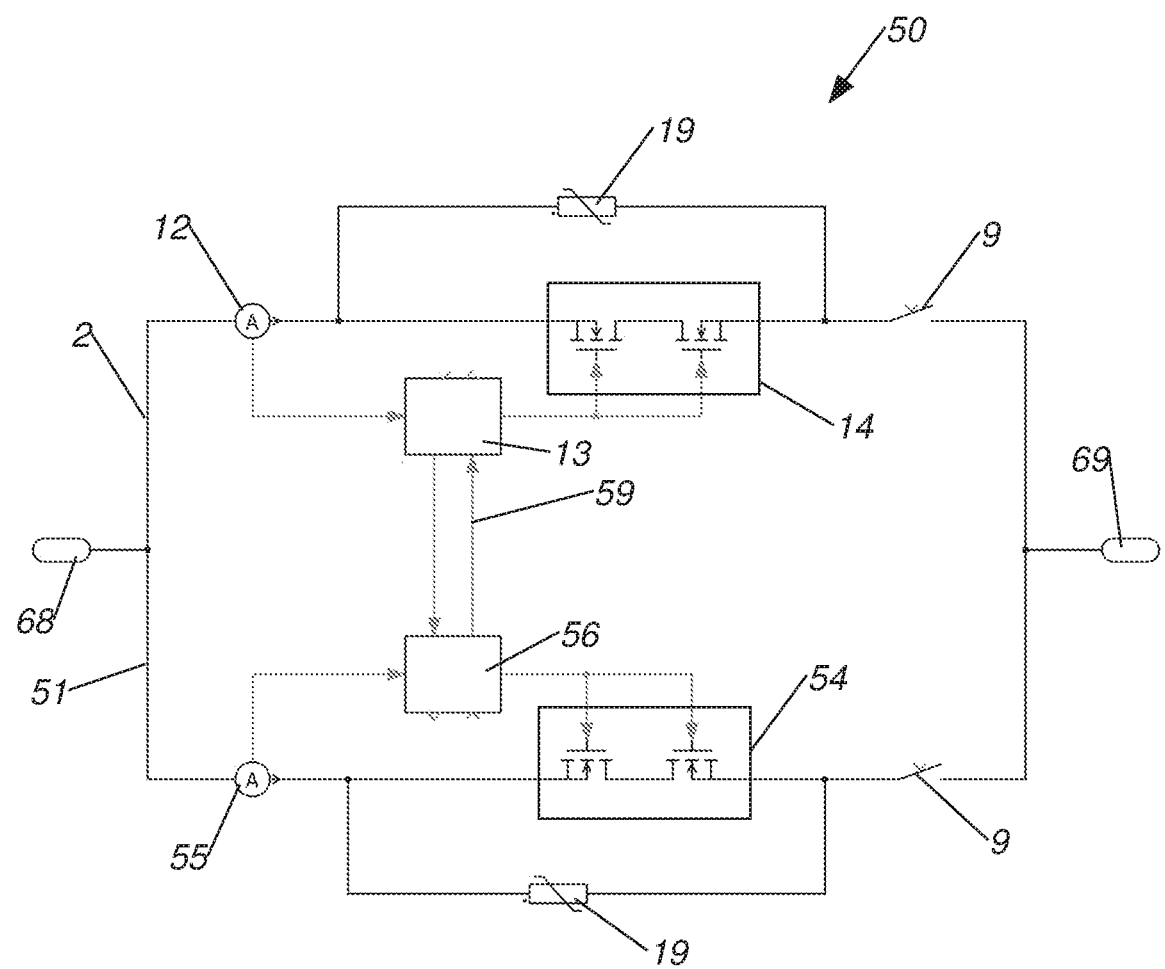
FIG. 5 shows a third embodiment of the present electrical circuit breaker assembly.

FIG. 5 shows a preferred further embodiment of an electrical circuit breaker assembly 50 comprising a first outer conductor line 2 and a second outer conductor line 51, wherein the first outer conductor line 2 is arranged in the circuit in parallel to the second outer conductor line 51, wherein a second semiconductor circuit assembly 14 is arranged in the first outer conductor line 2, wherein a first current measuring assembly 12, which is connected to a first electronic control unit 13, is arranged in the first outer conductor line 2, wherein the first electronic control unit 13 is designed for the purpose of actuating the second semiconductor circuit assembly 14, wherein a fourth semiconductor circuit assembly 54 is arranged in the second outer conductor line 51, wherein a second current measuring assembly 55, which is connected to a second electronic control unit 56, is arranged in the second outer conductor line 51, wherein the second electronic control unit 56 is designed for the purpose of actuating the fourth semiconductor circuit assembly 54, wherein the first electronic control unit 13 and the second electronic control unit 56 have a communication connection.

The first electronic control unit 13 regulates the second semiconductor circuit assembly 14 and the second electronic control unit 56 regulates the fourth semiconductor circuit assembly 54 to balance a first current strength via the first outer conductor line 2 and a second current strength via the second outer conductor line 51, and/or wherein the first electronic control unit 13 and the second electronic control unit 56 switch off the second outer conductor line 51 in the event of a first current strength and/or a second current strength less than a predefinable limiting value.

It is thus possible to connect multiple solid-state outer conductor lines in parallel, either inside a single switching device or by parallel connection of multiple switching devices, without the entire current load or at least a predominant part of the current load being able to be handled by only one of the participating outer conductor lines 2, 51. It is thus possible to prevent one of the participating outer conductor lines 2, 51 from aging and failing more rapidly due to excess power loss than the at least one other outer conductor line 2, 51. It is thus furthermore possible to prevent a total failure of one of the outer conductor lines 2, 51 from occurring in case of an emergency shutdown.

All statements on the embodiments according to FIGS. 1 to 3—if they are not in obvious contradiction to the electrical circuit breaker assembly 50 according to FIG. 5—are to be applied. In particular, all statements on the usage environment and the preferred embodiments of the participating components, because of which a reproduction of these preferred implementations is omitted in the present case. These relate in particular to the implementation of the electrical circuit breaker assembly 50 in one or more devices.

In relation to the embodiment according to FIGS. 1 and 2, the electrical circuit breaker assembly 50 according to FIG. 5 does not have a first semiconductor circuit assembly or a bypass switch. It is a so-called solid-state circuit breaker in this case.

The nomenclature introduced at the outset was maintained with respect to the identification of the individual semiconductor circuit assemblies.

In contrast to the other embodiments, the second semiconductor circuit assembly 14 and the fourth semiconductor circuit assembly 54 are each formed comprising high-voltage MOSFETs 15. These bear the complete switching load in this type of circuit assembly. Other types of semiconductors can also be provided, for example, IGBTs.

Figure 4:
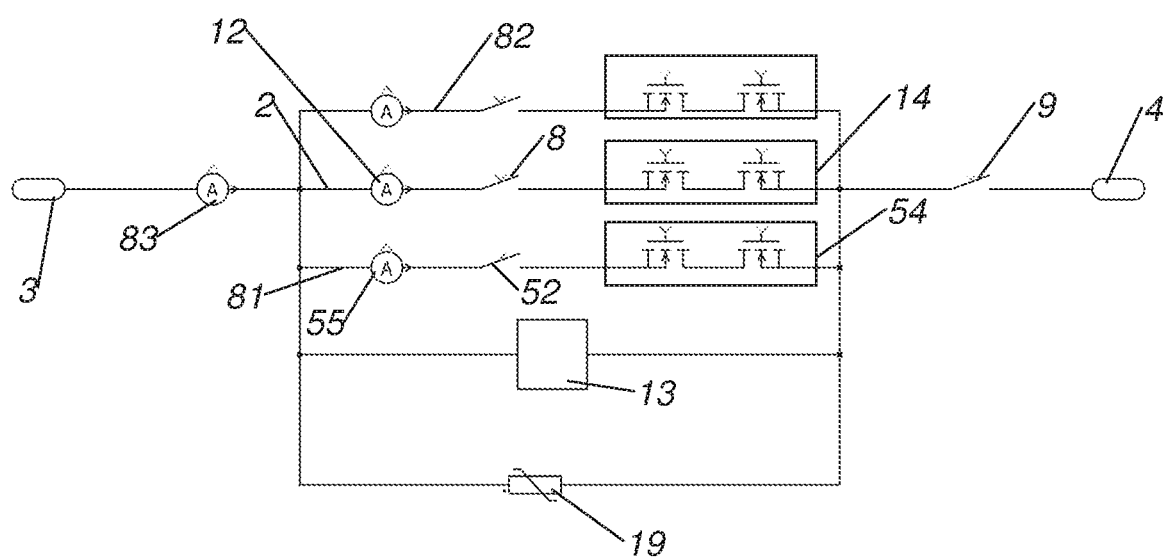
FIG. 4 shows a second embodiment of a discrete low-voltage circuit breaker device.

FIG. 4 shows a preferred embodiment of a low-voltage circuit breaker device 1 comprising a first outer conductor line 2 and at least one first bypass line 81, wherein the first outer conductor line 2 is arranged in parallel in the circuit to the at least one first bypass line 81, wherein a first mechanical bypass switch 8 is arranged in the first outer conductor line 2, wherein a first semiconductor circuit assembly 11 is connected in parallel to the first bypass switch 8, wherein a second semiconductor circuit assembly 14 is arranged in the circuit in series with the first bypass switch 8 and parallel to the first semiconductor circuit assembly 11 in the first outer conductor line 2, wherein a first current measuring assembly 12, which is connected to a first electronic control unit 13, is arranged in the first outer conductor line 2, wherein the first electronic control unit 13 is designed for the purpose of actuating the first bypass switch 8, the first semiconductor circuit assembly 11, and the second semiconductor circuit assembly 14, wherein a second mechanical bypass switch 52 is arranged in the first bypass line 81, wherein a fourth semiconductor circuit assembly 54 is arranged in series in the circuit with the second bypass switch 52 in the first bypass line 81, wherein a second current measuring assembly 55, which is connected to the first electronic control unit 13, is arranged in the first bypass line 81, wherein the first electronic control unit 13 is furthermore designed for the purpose of actuating the second bypass switch 52 and the fourth semiconductor circuit assembly 54.

The first electronic control unit 13 regulates the second semiconductor circuit assembly 14 and the fourth semiconductor circuit assembly 54 to balance a first current strength via the first outer conductor line 2 and a second current strength via the first bypass line 81, and/or the first electronic control unit 13 switches off the first bypass line 81 in the event of a first current strength and/or a second current strength less than a predefinable limiting value.

It is thus possible to relieve a hybrid outer conductor line 2 by connecting at least one bypass line 81, 82 in parallel, without the entire current load or at least a predominant part of the current load having to be handled by only one of the participating lines 2, 81, 82. It is thus possible to prevent one of the participating lines from aging and failing more rapidly due to excess power loss than the at least one further line. It is thus furthermore possible to prevent a total failure from occurring in case of an emergency shutdown.

All statements on the embodiments according to FIGS. 1 to 3—if they are not in obvious contradiction to the low-voltage circuit breaker device 1 according to FIG. 4—are to be applied. In particular, all statements on the usage environment and the preferred embodiments of the participating components, because of which in the present case a reproduction of these preferred implementations is omitted.

In relation to the embodiment according to FIGS. 1 and 2, the low-voltage circuit breaker device 1 according to FIG. 4 only has a single outer conductor line 2, comprising the first and second semiconductor circuit assemblies 11, 14.

Instead of further outer conductor lines, at least one first bypass line 81 is provided, which has a second current measuring assembly 55, a second bypass switch 52, and a fourth semiconductor circuit assembly 54.

According to FIG. 4, furthermore a correspondingly designed second bypass line 82 is provided, wherein further bypass lines can be provided.

The low-voltage circuit breaker device 1 furthermore has a so-called global current measuring assembly 83, which measures the overall current before the allocation into partial currents and transmits it to the first control unit 13.

The nomenclature introduced at the outset was maintained with respect to the identification of the individual semiconductor circuit assemblies.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A low-voltage circuit breaker device, comprising:
a first outer conductor line and at least one first bypass line, the first outer conductor line being arranged in a circuit in parallel to the at least one first bypass line;
a first mechanical bypass switch arranged in the first outer conductor line;
first semiconductor circuit assembly connected in parallel to the first bypass switch;
a second semiconductor circuit assembly arranged in the circuit in series with the first bypass switch and parallel to the first semiconductor circuit assembly in the first outer conductor line;
a first current measuring assembly, which is connected to a first electronic control unit, arranged in the first outer conductor line, the first electronic control unit being configured to actuate the first bypass switch, the first semiconductor circuit assembly, and the second semiconductor circuit assembly;
a second mechanical bypass switch arranged in the first bypass line;
a fourth semiconductor circuit assembly arranged in the circuit in series with the second bypass switch in the first bypass line; and
a second current measuring assembly, which is connected to the first electronic control unit, arranged in the first bypass line, wherein the first electronic control unit is configured to actuate the second bypass switch and the fourth semiconductor circuit assembly, wherein the first electronic control unit is configured to regulate the second semiconductor circuit assembly and the fourth semiconductor circuit assembly to balance a first current strength via the first outer conductor line and a second current strength via the first bypass line, and/or wherein the first electronic control unit is configured to switch off the first bypass line if the first current strength and/or the second current strength is less than a predefinable limiting value.

2. The low-voltage circuit breaker device as claimed in claim 1, wherein the second semiconductor circuit assembly and the fourth semiconductor circuit assembly each comprise a low-voltage semiconductor.

3. The low-voltage circuit breaker device as claimed in claim 1, wherein the second semiconductor circuit assembly and the fourth semiconductor circuit assembly are configured to be bidirectional.

4. The low-voltage circuit breaker device as claimed in claim 2, wherein the first electronic control unit is configured to regulate a gate voltage of the second semiconductor circuit assembly, and the second electronic control unit is configured to regulate a gate voltage of the fourth semiconductor circuit assembly.

5. The low-voltage circuit breaker device as claimed in claim 1, wherein the low-voltage circuit breaker assembly further comprises at least one second bypass line, which is arranged in the circuit in parallel to the first outer conductor line and the first bypass line.

6. The low-voltage circuit breaker device as claimed in claim 1, wherein the first low-voltage circuit breaker device further comprises a first communication interface, which has a communication connection to the first electronic control unit.

7. The low-voltage circuit breaker device as claimed in claim 2, wherein the low-voltage semiconductor comprises a low-voltage MOSFET.

8. The low-voltage circuit breaker device as claimed in claim 3, wherein the second semiconductor circuit assembly and the fourth semiconductor circuit assembly each comprise a bidirectional four-quadrant switch.

* * * * *